(12) United States Patent
Brask et al.

(10) Patent No.: US 9,975,120 B2
(45) Date of Patent: May 22, 2018

(54) CHIP ASSEMBLY FOR USE IN A MICROFLUIDIC ANALYSIS SYSTEM

(71) Applicant: SOPHION BIOSCIENCE A/S, Ballerup (DK)

(72) Inventors: Anders Brask, Kgs. Lyngby (DK); Jonatan Kutchinsky, Ballerup (DK)

(73) Assignee: SOPHION BIOSCIENCE A/S, Ballerup (DK)

( * ) Notice: Subject to any disclaimer, the term of this patent is extended or adjusted under 35 U.S.C. 154(b) by 0 days. days.

(21) Appl. No.: 15/218,642

(22) Filed: Jul. 25, 2016

(65) Prior Publication Data

US 2016/0332160 A1    Nov. 17, 2016

Related U.S. Application Data

(63) Continuation of application No. 13/809,097, filed as application No. PCT/EP2011/061390 on Jul. 6, 2011, now abandoned.

(Continued)

(30) Foreign Application Priority Data

Mar. 10, 2011    (EP) .................................... 11157598

(51) Int. Cl.
*B01L 3/00* (2006.01)
*B32B 37/12* (2006.01)
*C09J 5/00* (2006.01)

(52) U.S. Cl.
CPC .......... *B01L 3/502707* (2013.01); *B01L 3/50* (2013.01); *B01L 3/5085* (2013.01); *B32B 37/1284* (2013.01); *C09J 5/00* (2013.01); *B01L 2200/0689* (2013.01); *B01L 2200/10* (2013.01); *B01L 2200/12* (2013.01); *B01L 2300/0645* (2013.01); *B01L 2300/0819* (2013.01); *Y10T 156/10* (2015.01)

(58) Field of Classification Search
CPC ....................... B01L 3/5085; B01L 2300/0645
USPC .................................... 422/552, 554; 156/60
See application file for complete search history.

(56) References Cited

U.S. PATENT DOCUMENTS 4,729,949 A *  3/1988  Weinreb ................. G01N 15/10
                                                          209/38
6,758,961 B1   7/2004  Vogel et al.
(Continued)

FOREIGN PATENT DOCUMENTS

CN            1369709 A        9/2002
CN          201066365 A        5/2008
(Continued)

*Primary Examiner* — Natalia Levkovich
(74) *Attorney, Agent, or Firm* — Muncy, Geissler, Olds & Lowe, P.C.

(57) ABSTRACT

A chip assembly for use in a microfluidic analysis system, such as a patch clamp apparatus, comprises a chip having an outer wall, a carrier structure comprising an aperture for receiving the chip, the aperture defining an inner wall, wherein the chip is arranged in the aperture with a liquid tight seal between the outer wall of the chip and the inner wall of the aperture. The chip may be sealed and bonded to the carrier structure by means of a bonding material, such as an UV curing adhesive. A through hole in the chip is aligned with the aperture in the carrier structure. A method for manufacturing the chip assembly is further disclosed.

8 Claims, 5 Drawing Sheets

Related U.S. Application Data

(60) Provisional application No. 61/362,926, filed on Jul. 9, 2010.

(56) References Cited

U.S. PATENT DOCUMENTS

| | | |
|---|---|---|
| 7,288,785 B2 | 10/2007 | Vestergaard et al. |
| 2005/0106752 A1 | 5/2005 | Yu et al. |
| 2005/0266478 A1* | 12/2005 | Huang .............. G01N 33/48728 435/6.11 |
| 2007/0141231 A1* | 6/2007 | Qiu ....................... B01L 3/5085 427/2.11 |
| 2007/0153053 A1 | 7/2007 | Back |
| 2011/0126590 A1 | 6/2011 | Ushio et al. |

FOREIGN PATENT DOCUMENTS

| | | |
|---|---|---|
| CN | 101588868 A | 11/2009 |
| JP | 2005-156234 A | 6/2005 |
| JP | 2005-523011 A | 8/2005 |
| JP | 2007-132837 A | 5/2007 |
| JP | 2010-043928 A | 2/2010 |
| JP | 2010-101819 A | 5/2010 |
| WO | WO 01/25769 | 4/2001 |
| WO | WO 03/089564 | 10/2003 |
| WO | WO 03/089564 A | 10/2003 |
| WO | WO 2007/012991 A1 | 2/2007 |
| WO | WO 2009/138939 A1 | 11/2009 |

* cited by examiner

CHIP ASSEMBLY FOR USE IN A MICROFLUIDIC ANALYSIS SYSTEM

CROSS REFERENCE TO RELATED APPLICATIONS

This application is a Continuation of co-pending application Ser. No. 13/809,097, filed on 8 Jan. 2013, which is a U.S. National Stage of International Application No. PCT/EP11/61390 filed on 6 Jul. 2011, for which priority is claimed under 35 U.S.C. § 120; and this application claims priority of application Ser. No. 11/157,598.1 filed in Europe on 10 Mar. 2011 under 35 U.S.C. § 119; and this application claims priority of U.S. Provisional Application No. 61/362,926 filed on 9 Jul. 2010 under 35 U.S.C. § 119(e), the entire contents of all of which are hereby incorporated by reference.

TECHNICAL FIELD

The present invention relates to a chip assembly for use in a microfluidic analysis system and to a method of manufacturing such a chip assembly. The integration of sensor chips in carrier plates, also referred to as microtitre plates, is of particular concern of the present invention. Embodiments of the chip assembly may provide a so-called lab-on-a-chip device, which integrates laboratory functions onto a single chip. The chip assembly, which may comprise an array of a plurality of chips on a single carrier, is applicable in a method for determining and/or monitoring electrophysiological properties of ion channels in ion channel-containing structures, typically lipid membrane-containing structures such as cells, by establishing an electrophysiological measuring configuration in which a cell membrane forms a high resistive seal around a measuring electrode, making it possible to determine and monitor a current flow through the cell membrane. The chip assembly is for example useful in a method for analysing the electrophysiological properties of a cell membrane comprising a glycocalyx. The chip assembly may be used in or form part of an apparatus for studying electrical events in cell membranes, such as an apparatus for carrying out patch clamp techniques utilised to study ion transfer channels in biological membranes.

BACKGROUND OF THE INVENTION

Microfluid analyses of biological systems are widely used in medical and biological research in order to assess the mutual effects of various combinations of reagents and samples. So-called microtitre plates have been developed, which are flat plates with a plurality of wells used as small test tubes. Such microtitre plates have become a standard tool in analytical research and clinical diagnostic testing laboratories.

Prior art document WO 01/25769 discloses an array of measuring sites with integrated measuring electrodes and integrated reference electrodes formed by wafer processing technology. The electrodes are adapted to conduct a current between them by delivery of ions by one electrode and receipt ions by the other electrode. At the measurement site, a cell is held in place over an aperture having a diameter of 0.1-10 μm, the aperture being formed in a substrate, which can be made from silicon, plastics, pure silica and other glasses such as quarts and pyrex or silica doped with one or more dopants selected from the group of Be, Mg, Ca, B, Al, Ga, Ge, N, P, As. Silicon is said to be the preferred substrate material.

International patent publication WO 03/089564 discloses a substantially planar substrate, i.e. a chip for use in patch clamp analysis of the electrophysiological properties of a cell membrane comprising a glycocalyx, wherein the substrate comprises an aperture having a wall defining the aperture, the wall being adapted to form a gigaseal upon contact with the cell membrane.

U.S. Pat. No. 6,758,961 discloses a measuring device, which permits position of cells and vesicles on planar carriers. The measuring device includes an Si/SiO$_2$ chip, which can be produced from commercially available Si wafers.

The dimensions of silicon chips for use in microfluid analysis systems have hitherto been governed, at least partly, by limitations in methods of manufacture there for. In particular, technologies for cutting chips from silica wafers have required a certain size of the chips in order to safeguard purity of the highly sensitive test-item supporting areas of the chips.

While the above disclosures are representative of various achievements in the field of microfluidic analysis systems, a need for further development still exists. The mounting of chips to carrier plates is of particular concern to the present invention with a view to facilitating production and reducing the amount of costly material, such as silicon, used for the high-precision production of chips.

Objects of Embodiments of the Invention

It is an object of embodiments of the invention to provide a chip assembly for use in a microfluidic analysis system, in which the amount of high-cost material used in the production of the chip itself can be minimised. It is a further object of embodiments of the invention to provide a chip assembly for use in a microfluidic analysis system, in which the chip can be integrated in a carrier, e.g. a carrier plate or a microtitre plate, in an easy manner.

SUMMARY OF THE INVENTION

In a first aspect, the invention hence provides a chip assembly for use in a microfluidic analysis system, comprising:
 a chip having an outer wall,
 a carrier structure comprising an aperture defining an inner wall;
wherein the chip is secured to the carrier structure with a liquid tight seal between the chip and the carrier structure, and wherein a hole is formed in the chip, the hole being arranged essentially coaxially with the aperture in the carrier structure.

A plurality of holes may be provided. The at least one hole is preferably in fluid communication with the aperture in the carrier structure. For the purpose of microfluidic analysis, notably patch clamp analysis, suction may conveniently be applied through the hole in the chip in order to secure a cell in place over the chip. It will hence be appreciated that the hole is preferably a through hole providing a passage from one surface of the chip to another surface thereof, e.g. from an upper surface of the chip to a lower surface thereof. In such case, the carrier structure preferably separates a first domain containing a microfluid flow of a liquid or gas from a second domain, which may be essentially dry. Electrodes may be provided in both domains in order to determine an electrical resistance, a flow of ions or a voltage difference across the cell and through the hole.

In the present context, the term 'coaxially' should be understood such that the hole in or through the chip at least partly overlaps with the aperture in the carrier structure, so as to provide a communication path for liquid and/or gas from between two domains facing respective sides of the chip assembly, e.g. with an upper side of the chip assembly (and/or chip and/or carrier structure) facing a first domain, and with a lower side of the chip assembly (and/or chip and/or carrier structure) facing a second domain. In some embodiments, a centre axis of the hole in the chip may hence be offset from a centre axis in the aperture, whereas in other embodiments, the two axes may coincide.

The chip is preferably secured to the carrier structure by means of a bonding material, which bonds the chip to the carrier structure and forms the liquid tight seal between the chip and the carrier structure. In one embodiment, the chip is mounted atop the carrier structure with the bonding and sealing material being provided along the periphery of the chip, i.e. at along its outer wall and/or along a lower surface thereof in the vicinity of the chip's periphery.

In another embodiment the chip may have an outer diameter, which is smaller than the diameter of the aperture in the carrier structure. The resulting circumferential gap between the outer wall of the chip and the inner wall of the aperture may be sealed with a bonding material, which bonds the chip to the carrier structure. It will hence be appreciated that the chip may be integrated in the carrier, rather than being placed on a surface of the carrier. One advantage thereof is that electrodes or sensor elements, which would otherwise have to be mounted on or integrated in the chip itself, may be arranged at the carrier structure, whereby the dimensions of the chip can be reduced. The benefit of the reduction of the chip dimension is that the precision required for microfluidic analysis requires the chip to be manufactured with high precision and usually from relatively costly materials, such as silicon, and therefore a reduction of the chip dimensions reduces overall material and manufacturing costs.

In a second aspect, the invention provides a method of manufacturing a chip assembly for use in a microfluidic analysis system, comprising:
   a chip having an outer wall, with a hole being provided in the chip;
   a carrier structure comprising an aperture defining an inner wall;
the method comprising the steps of
   securing the chip to the carrier structure with the hole arranged essentially coaxially with the aperture in the carrier structure; and
   forming a liquid tight seal between the chip and the carrier structure.

Embodiments of the method according to the second aspect of the invention result in a chip assembly according to the first aspect and accordingly achieve the above-mentioned benefits and advantages.

In a third and most general aspect, the present invention provides a chip assembly for use in a microfluidic analysis system, comprising a chip and a carrier structure for supporting the chip, the carrier structure comprising an aperture, wherein the chip is secured to the carrier structure in such a way that the chip overlaps the aperture in the carrier structure, with a liquid tight seal being provided between the chip and the carrier structure.

In embodiments of the first, second and third aspects of the present invention, the chip may be made from silicon, plastics, pure silica and other glasses such as quarts and pyrex or silica, optionally doped with one or more dopants selected from the group of Be, Mg, Ca, B, Al, Ga, Ge, N, P, As. Silicon is the presently preferred substrate material for the chip.

Herein, the carrier structure is also referred to as a carrier plate or a microtitre plate. The carrier is preferably made from a material different from the material of the chip, such as from metal oxide, such as aluminium oxide, ceramics, glass, quartz or from a plastics material. In preferred embodiments of the invention, the material of the carrier structure is characterised by a significantly lower cost than the cost of the material for the chip, which is to be manufactured with high precision. The carrier structure need not be manufactured with as high precision, and accordingly less costly materials are applicable for the carrier structure.

The inner wall of the aperture may circumferentially encircle or surround the outer wall of the chip. Embodiments of the chip made from silicon are preferably square, rectangular, triangular or hexagonal in order to allow it to be cut from a standard silicon wafer, the crystalline structure of which promotes linear cutting. However, other shapes, including a circular shape are envisaged. The aperture of the carrier preferably has the shape of the chip, though other shapes may be adopted, provided that a liquid tight seal between the chip and the carrier can be provided. In use, i.e. during microfluidic analysis, the carrier preferably separates a first domain containing a microfluid flow of a liquid or gas from a second domain.

An upper surface of the chip, which is preferably substantially planar, may be configured to support a test item, e.g. an ion-channel containing structure, such as lipid membrane-containing structure, such as a cell, for electrochemical analysis thereof. The electrochemical analysis may hence take place while the test item is subjected to a fluid in contact with the item. It will accordingly be understood that the chip may be capable of conducting an electric current and/or capable of allowing ions to pass there through, e.g through an orifice or aperture formed therein, so that an electrical connection may be established between two domains on either side of the chip.

By way of example, the chip assembly according to the present invention is applicable in: patch clamp analysis; other kinds of electrochemical analyses, in which a wet domain is separated from a dry domain; a coulter counter; flow cytometry; microfluid analysis systems, wherein electrodes are provided on a single side of the chip, e.g. for the purpose of performing measurements on a immobilized or moving cell; miniature cantilever analysis for mass determination of e.g. single cells.

LEGEND TO THE DRAWINGS

DETAILED DESCRIPTION OF EMBODIMENTS OF THE INVENTION

Embodiments of the invention will now be further described with reference to the accompanying drawings, which are provided by way of illustration only, and which are not limiting on the scope of the appended claims.

Figure 1:
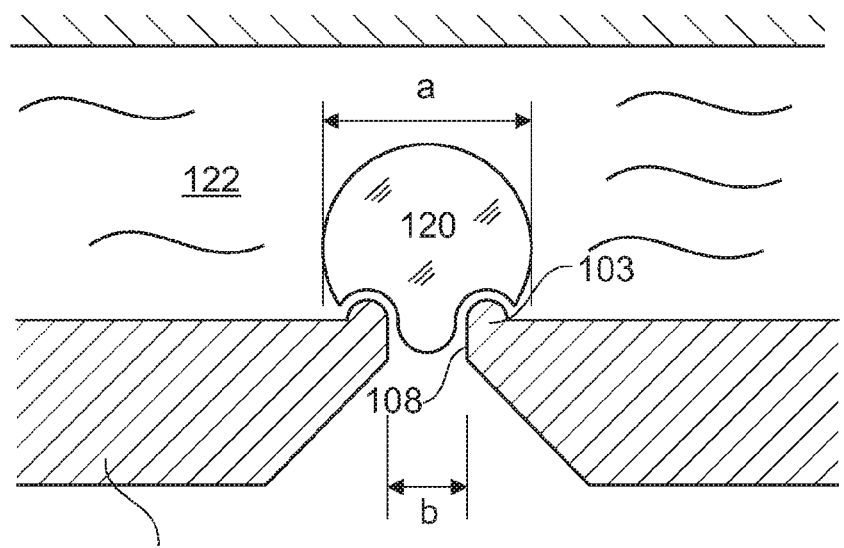
FIG. 1 illustrates a microfluid system for use in patch clamp analysis.

FIG. 1 shows a chip 102 for use in patch clamp analysis of a cell 120 sealed to the chip 102 at protrusion 103, which forms a gigaseal, as disclosed in WO 03/089564, which is hereby incorporated by reference. The chip 102 is attached to or integrated in a carrier (not shown in FIG. 1), which separates a microfluid flow domain 122 on a first side of the chip from a second domain on an opposite side thereof. The diameter a of the cell is approximately 5-20 µm, such as approximately 10 µm. A hole 108 is formed in the chip 102, through which suction may be applied to secure the cell 120 in place over the chip. Electrodes (not shown) may be provided in both of the aforementioned domains in order to determine an electrical resistance, a flow of ions or a voltage difference across the cell and through the hole 108.

FIGS. 2-6 illustrate various embodiments of a chip assembly 100 according to the invention, comprising a chip 102 and a carrier structure 104, which may e.g. be comprised of a carrier plate or a microtitre plate. The chip 102 is received in an aperture 110 in the carrier structure 104. The diameter of the chip 102 is slightly smaller than the diameter of the aperture 110, so that a gap exists between an outer wall 105 of the chip 102 and an inner wall 107 of the carrier structure 104. The chip 102 is arranged in the aperture 110 with a liquid tight seal 106 between the outer wall 105 of the chip 102 and the inner wall 107 of the aperture 110.

In the embodiments shown in FIGS. 2-6, a hole 108 is formed in the chip 102 for the purpose of securing a test item thereto, e.g. for patch clamp analysis, as described above with reference to FIG. 1. In the present embodiments the hole 108 is a through-hole.

In preferred embodiments of the invention, the seal 106 also forms a bonding material for bonding the chip 102 to the carrier structure 104.

The bonding material is preferably applied to the gap between the chip 102 and the carrier structure 104 in a liquid state and subsequently cured to a solid or highly viscous state forming a permanent bond between the chip 102 and the carrier structure 104. It has been found that an even distribution of the bonding material 106 between the outer wall 105 of the chip 102 and the inner wall of 107 of the carrier structure 104 is obtainable when, during manufacture of the chip assembly 100, the bonding material is dispensed into the aperture from one or more dispensing wells and allowed to flow into the gap between the chip 102 and the carrier structure 104 by capillary action.

In order to allow the bonding material to distribute evenly in the gap under capillary action, the bonding material 106 is preferably selected such that, before curing thereof, the interfacial energy density of the interface between the carrier structure 104 and the surrounding atmosphere, e.g. atmospheric air, is larger than the interfacial energy density of the interface between the carrier structure 104 and the bonding material 106. Most preferably, the sum of the interfacial energy density of the interface between the carrier structure and the bonding material and the interfacial energy density of the interface between the chip and the bonding material is less than the interfacial energy density of the interface between bonding material and the surrounding atmosphere, e.g. atmospheric air. As used herein, the term 'interfacial energy density' may be understood as surface tension, i.e. force per unit length.

It has further been found that the viscosity of the bonding material influences the ability of the material to flow under capillary action and distribute evenly in the gap between the chip 102 and the carrier structure 104. In preferred embodiments of the invention, the bonding material has a viscosity at the application temperature, e.g. at room temperature or at elevated dispensing temperatures, of between 1 and 100000 mPa s, such as between 5 and 50000 mPa s, such as between 10 and 1000 mPa s, such as between 50 and 500 mPa s before curing thereof, more preferably between 150 and 400 mPa s. In case the chip is mounted atop the carrier structure, capillary action does not play a significant role for the distribution of the adhesive, and accordingly a higher viscosity is generally applicable. More specifically, a viscosity between 1000 and 200000 mPa s has been found most useful, preferably a viscosity between 50000 and 150000 mPa s, such as approximately 100000 mPa s.

Further, in order to achieve an even distribution of the bonding material during application thereof, bonding material preferably forms a contact angle with the carrier structure of less than 90 degrees when placed in atmospheric air under atmospheric pressure, i.e. 1 bar, before curing of the bonding material.

The bonding material may for example be selected from the group consisting of: a hotmelt glue, an acrylic UV curable adhesive, and an epoxy-based UV curable adhesive. For example, one of the following adhesives may be applied:

An acrylic based, UV curable adhesive having a viscosity of about 150 mPa s at 20-25 deg. C.

An epoxy based, UV curable adhesive having a viscosity of about 400 mPa s at 20-25 deg. C.

An acrylic based, UV curable adhesive having a viscosity of about 300 mPa s at 20-25 deg. C.

In embodiments, in which the chip is mounted atop the carrier structure, adhesives may be applied, which are non-liquid at the dispensing temperature. Thermosetting epoxy-based adhesives have been found useful, such as one-component or two-component thermosetting epoxy-based adhesives, or cyano-acrylate adhesive. These types of adhesives are preferably selected to have a viscosity of about 1000 to 200000 mPa s at the dispensing temperature, such as preferably approximately 100000 mPa s or approximately 50000 mPa s, such as between 1 and 200000 mPa s, such as between 5 and 100000 mPa s, such as between 10000 and 100000 mPa s, such as between 35000 and 75000 mPa s, such as between 40000 and 60000 mPa s.

In order to ensure biocompatibility during microfluidic analysis of biological matter, such as cells, a biocompatible bonding material may be used. Moist and/or heat may be applied to enhance bonding.

Figure 2:
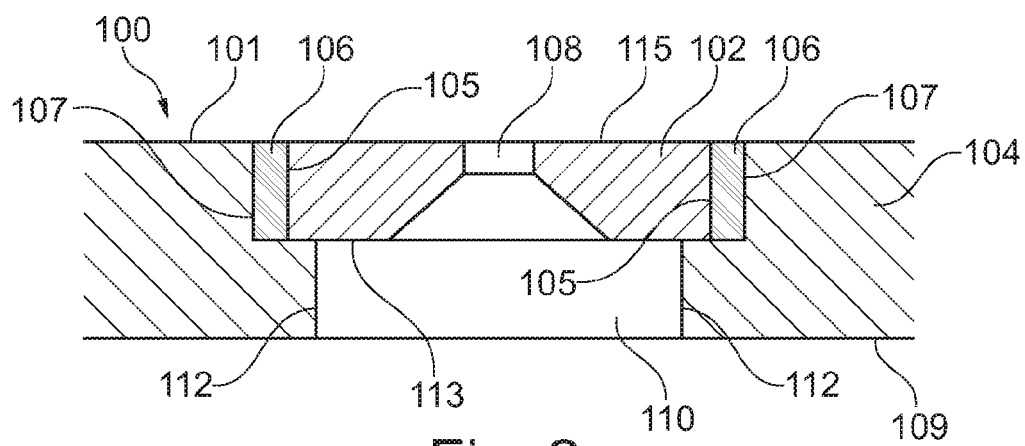
FIGS. 2-6 illustrate various embodiments of a chip assembly according to the invention.
Figure 3:
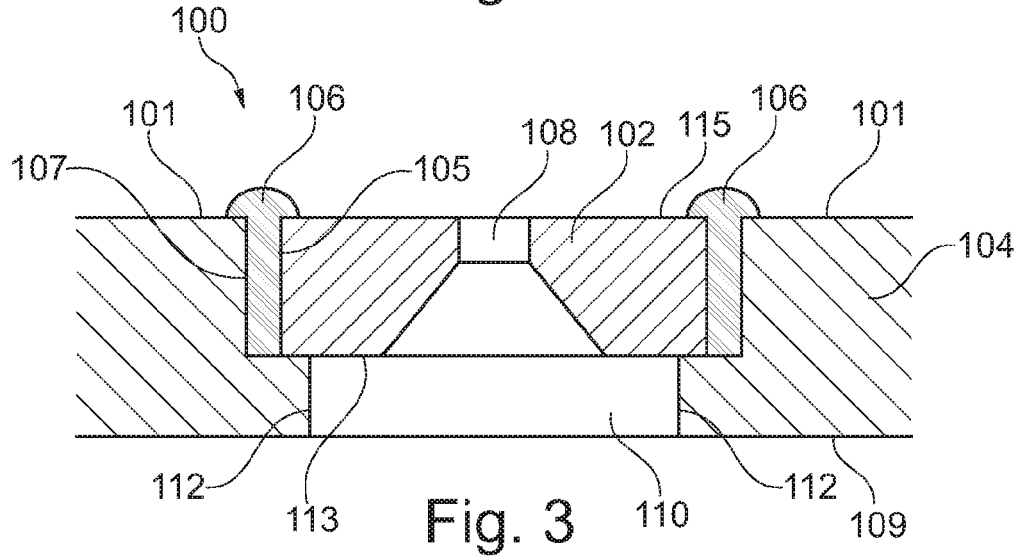

In the embodiments of FIGS. 2 and 3, the aperture 110 of the carrier structure 104 forms a collar 112 at a depth in the aperture, which is essentially equal to the thickness of the chip 102, with a rim of a lower surface 113 of the chip 102 resting on the collar 112. An upper surface 115 of the chip 102 lies flush with an upper surface 101 of the carrier structure 104, so as to avoid edges or pockets, which may collect assay fluid of the microfluid flow domain 122 (see FIG. 1) in an undesirable manner, or which may create undesired flow vortices. In the embodiment of FIG. 2, the bonding material 106 is entirely contained in the gap between the chip 102 and the carrier structure 104 below the level of the upper surface 101 of the carrier structure 104, whereas in the embodiment of FIG. 3, a slight excess of the bonding material 106 has been provided so that it protrudes above the level of the upper surface 101 of the carrier structure. Such protrusion may be acceptable to the extent that the flow of assay fluid in the microfluidic flow domain 122 is not obstructed and to the extent that it does not allow collection of fluid. Due to the provision of the collar 112 in the embodiments of FIGS. 2 and 3, a lower surface 113 of the chip 102 is at an elevated level with respect to the level of a lower surface 109 of the carrier structure 104. The collar 112 enables precise positioning of the chip 102 with respect to the carrier structure 104.

Figure 4:
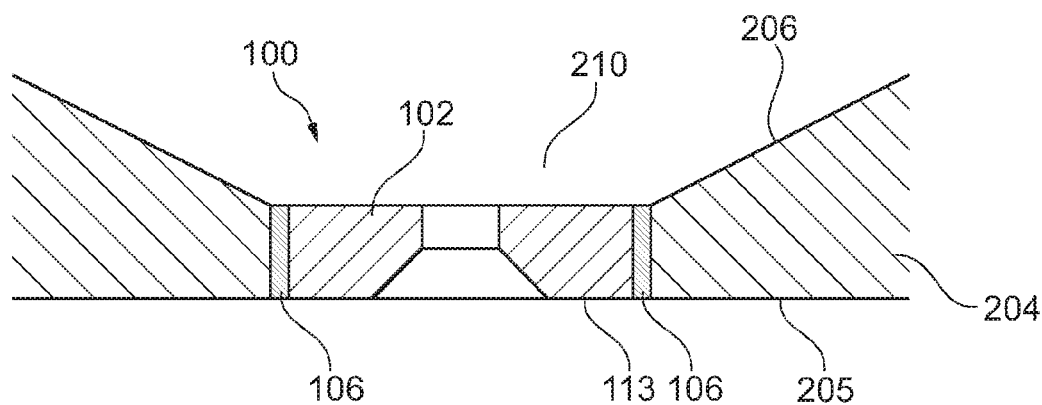
Figure 6:
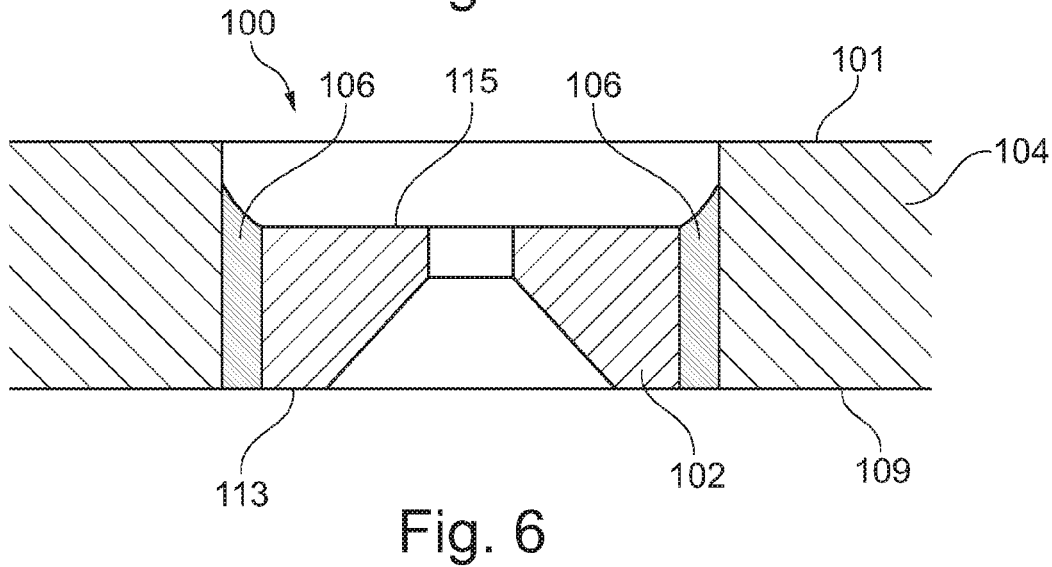

FIG. 4 illustrates a chip assembly 100 comprising an embodiment of the carrier structure 204, wherein the chip is arranged in aperture 210 at the bottom of a well formed by an inclined upper surface 206 of the carrier structure 204. The lower surface 113 of the chip 102 lies flush with a lower surface 205 of the carrier structure 204 in order to allow the chip and the carrier structure to be assembled by an embodiment of the method according to the second aspect of the invention as described below with reference to FIGS. 11-13. In the embodiment of FIG. 6, the thickness of the carrier structure 104 exceeds the thickness of the chip 102, whereby the upper surface 115 of the chip 102 is at a lower level than the upper surface 101 of the carrier structure 104.

Figure 5:
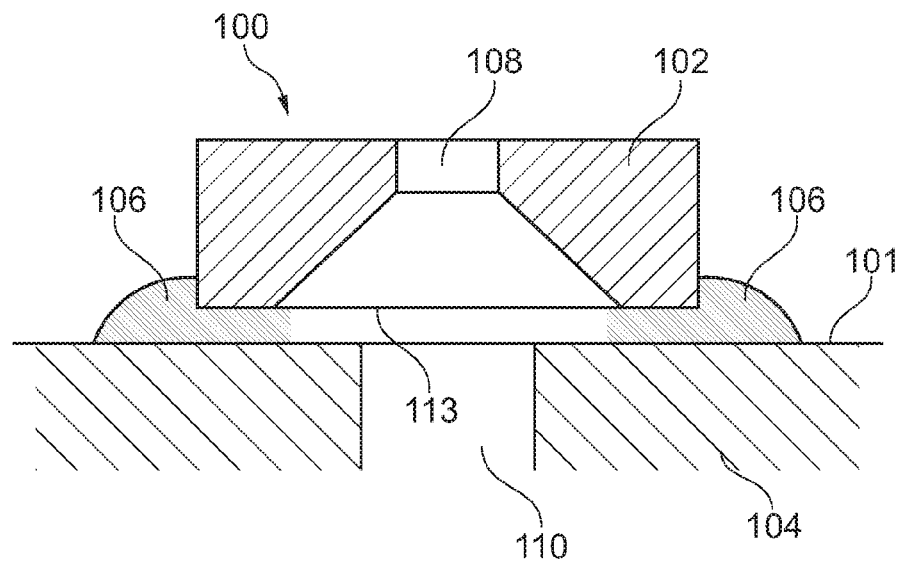

FIG. 5 illustrates an embodiment of the third aspect of the invention, in which the chip 102 is mounted with its lower surface 113 resting substantially on the upper surface 101 of the carrier structure 104, and with the bonding material 106 sealing along a lower rim of the chip 102. The through-hole 108 in the chip 102 is arranged essentially coaxially with the aperture 110 in the carrier 104 for microfluid analysis, e.g. patch clamp analysis, of a test item, such as cell, positioned at the hole 108 as generally depicted in FIG. 1.

Figure 7:
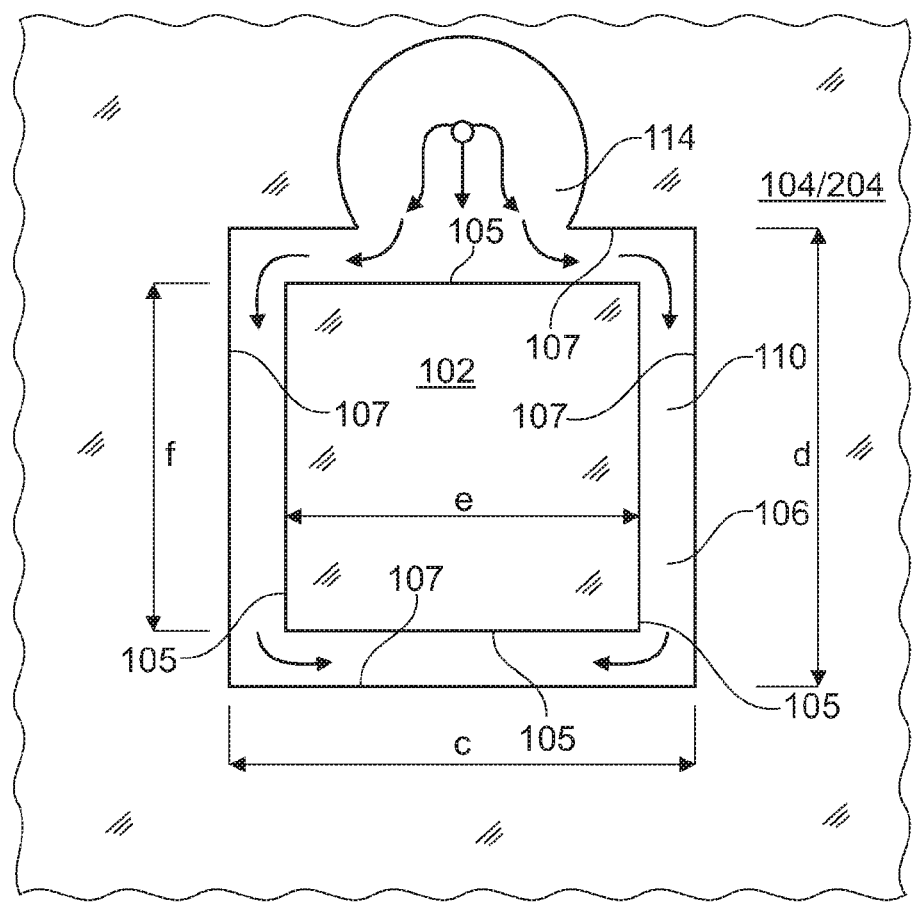
FIGS. 7-9 illustrate embodiments of a dispensing well for application of a bonding material to a chip assembly according to the invention.
Figures 8, 9:
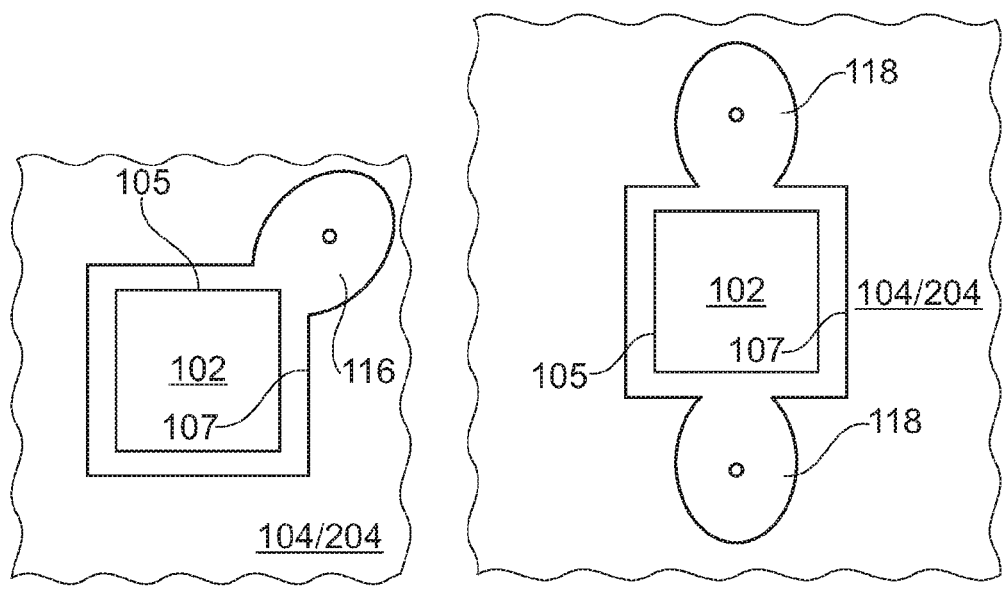

In order to allow the bonding material 106 to distribute evenly in the gap between the chip 102 and the carrier structure 104 and 204 in the embodiments of FIGS. 2-4 and 6, the carrier structure 104, 204 may be provided with one or more dispensing wells 114, 116, 118 as shown in FIGS. 7-9. An external device, such as a syringe, for application of the bonding material may be placed in or over the dispensing well or wells 114, 116, 118, whereby liquid bonding material may flow into and fill the gap between the chip 102 and the carrier structure 104, 204 under capillary action. In the embodiment of FIG. 7, a single dispensing well 114 is provided at one edge of the aperture 110 in the carrier structure, and in the embodiment of FIG. 8, a single dispensing well 116 is provided at one corner of the aperture 110. As shown in FIG. 9, a plurality of dispensing wells 118 may be provided at respective edge portions of the aperture 110. In the finalized product, when the bonding material 106 has cured, the gap between the chip 102 and the carrier structure 104, 204 communicates with at least one dispensing well 114, 116, 118 in the carrier, which is filled with the bonding material.

In other embodiments of the invention, the chip 102 may be press fitted into the carrier structure 104. For example, the bonding material may be made from a mouldable material, which is applied along the inner wall 107 of the carrier structure 104, 204, before the chip 102 is placed in the aperture 110, 210 in the carrier structure. Subsequently, the chip 102 may be press fitted into the packing formed by the mouldable material forming the bonding material.

Figure 10:
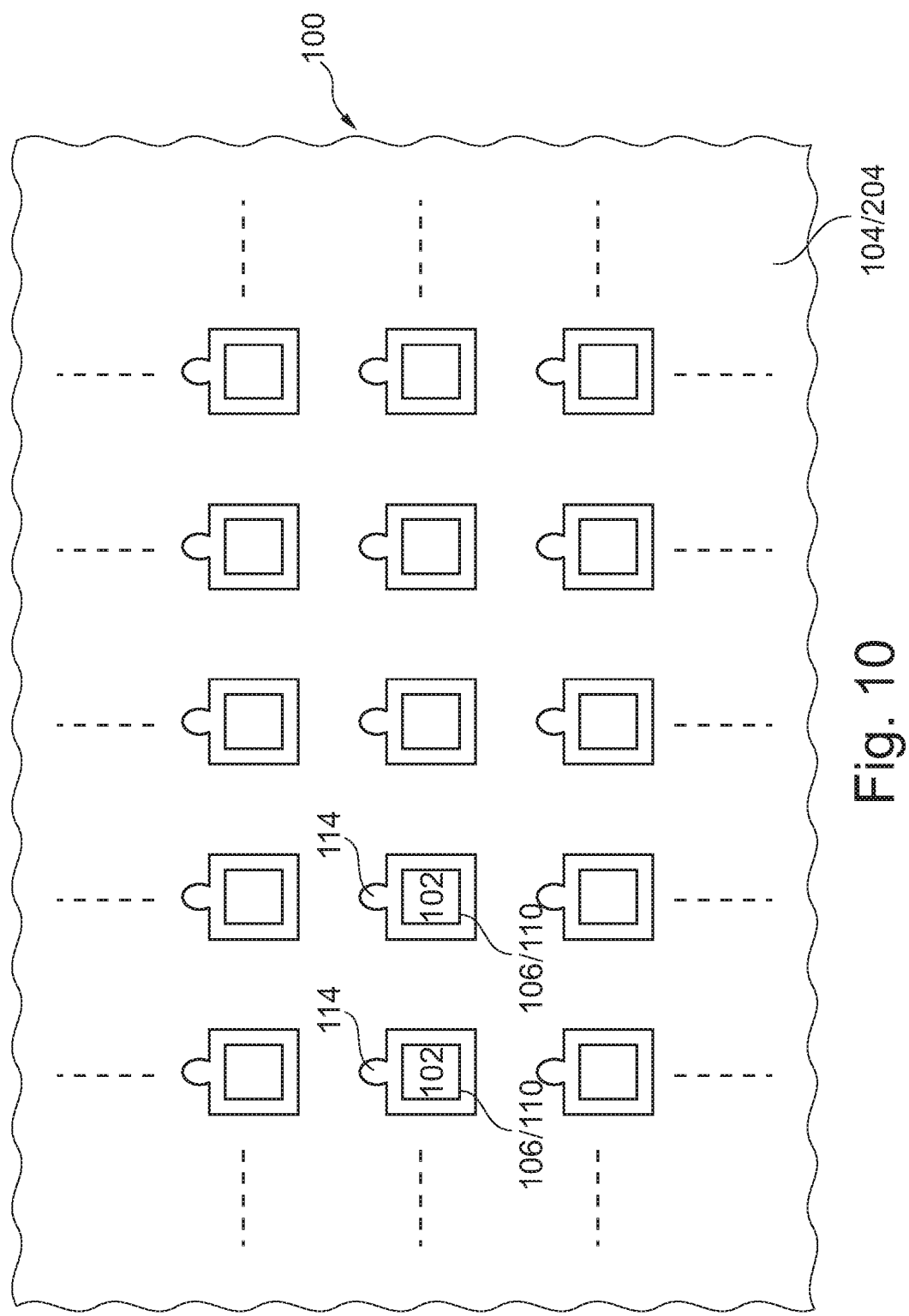
FIG. 10 illustrates an embodiment of the chip assembly according to the invention comprising an array of chips on a carrier.

The chip assembly of the present invention may be provided as an array of chips received in respective apertures in the carrier structure 104, 204 as shown in FIG. 10. For example, a total of 128 or more chips 102 may be provided on a single carrier structure.

For the purpose of conducting microfluidic analysis, the chip 102 and the carrier 104, 204 may be arranged to separate a first domain 122 (see FIG. 1) from a second domain (not shown) through a test item supported by the chip, such as through a cell 120. The carrier structure 104 may advantageously support a plurality of electrodes capable of generating a current between them by delivery of ions by one of the electrodes and receipt of ions by another one of the electrodes. For example, the chip 102 may be configured to hold an ion channel-containing structure and to separate a first domain defined on a first side of the ion-channel containing structure from a second domain defined on a second side of the ion-channel containing structure. The carrier may be configured to support a first one of the electrodes in electrolytic contact with the first domain 122 and to support a second one of the electrodes in electrolytic contact with the second domain.

In the embodiment of FIG. 10, respective sets of electrodes are preferably in association with each of the chips 102, so that each chip provides an individual measurement site.

Embodiments of the present invention may be useful for determining or monitoring current flow through ion channel-containing structures such as cell membranes, with a high throughput and reliability and under conditions that are realistic with respect to the influences to which the cells or cell membranes are subjected. Thus, the results determined, e.g., variations in ion channel activity as a result of influencing the cell membrane with, e.g., various test compounds, can be relied upon as true manifestations of the influences proper and not of artefacts introduced by the measuring system, and can be used as a valid basis for studying electrophysiological phenomena related to the conductivity or capacitance of cell membranes under given conditions.

This is because the current through one or more ion channels is directly measured using reversible electrodes as characterized below, typically silver/silver halide electrodes such as silver chloride electrodes, as both measuring electrodes and reference electrodes.

Embodiments of the invention may be used not only for measurements on cell membranes, but also on other ion channel-containing structures, such as artificial membranes. The invention permits performing several tests, such as electrophysilogical measurements on ion transfer channels and membranes, simultaneously and independently. The substrate of the invention constitutes a complete and easily handled microsystem which uses only small amounts of supporting liquid (a physiological salt solution, isotonic with the cells, that is, normally having an osmolarity of 150 millimolar NaCl or another suitable salt) and small amounts of test samples.

Generally, embodiments of the present invention are applicable in, inter alia, such fields of use as disclosed in WO 01/25769 and WO 03/089564, which are hereby incorporated by reference.

The diameter of the chip 102, that is dimensions e and f in FIG. 7, may be between 0.1 and 2 mm, such as between 0.5 and 1.5 mm, such as approximately 1 mm. In square embodiments, dimensions e and f are identical; however in rectangular embodiments of the chip 102 they will be different. The diameter of the aperture 110, 210 in the carrier structure 104, 204, that is dimensions c and d in FIG. 7, is preferably about 10-30% larger than the diameter of the chip 102, such as for example between 0.2 and 2.5 mm, such as between 0.8 and 1.5 mm, such as approximately 1.2 mm in embodiments, in which the chip diameter is approximately 1 mm. In such embodiments, a total volume of bonding material of approximately 1-2 µl is applied to attach and seal the chip to the carrier structure.

The carrier structure 104, 204 and the chip 102 may have approximately the same thickness, though they are shown with different thicknesses in FIGS. 2-4, 6 and 11-13. The thickness is preferably less than 2 mm, such as between 0.3 and 0.6 mm, such as approximately 0.5 mm.

The projected chip area, that is the surface area of the upper and lower surfaces of the chip, is preferably at most 5 mm$^2$, such as at most 3 mm$^2$, 2 mm$^2$, 1.5 mm$^2$ or 1 mm$^2$, in order to minimize the use of silicon or other costly material, from which the chip is to be manufacture due to precision requirements.

The chip may be cut into the desired dimensions by wafer cutting technology or by dicing, such as stealth dicing. The chip may, for example, be manufactured in accordance with the principles and examples disclosed in WO 03/089564, which is hereby incorporated by reference. Preferably, the chip is cut from an Si wafer by laser cutting, which has been found to constitute a method particularly well suited for chips of small dimensions, i.e. chips having a projected area of at most 5 mm$^2$.

Figure 11:
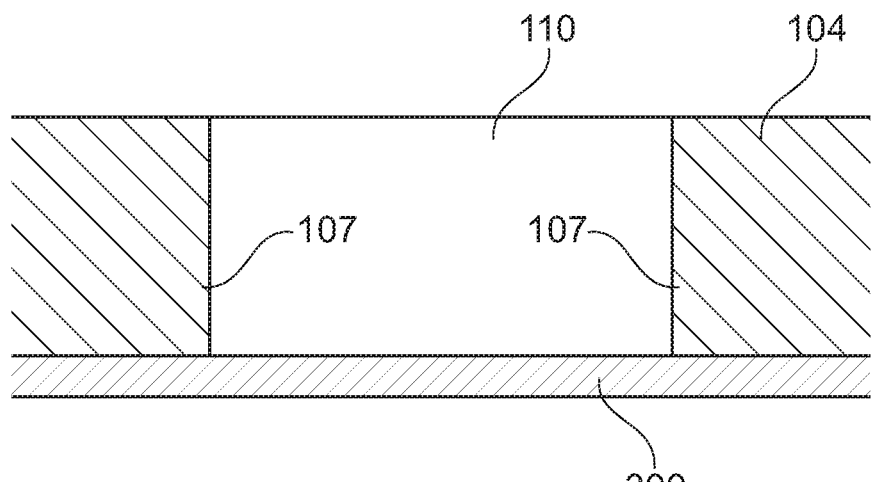
FIGS. 11-13 illustrate an embodiment of the method according to the invention.
Figure 12:
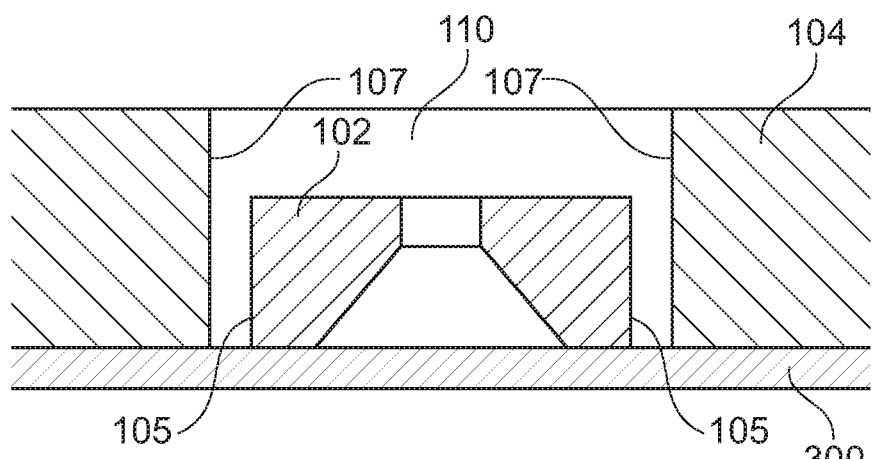
Figure 13:
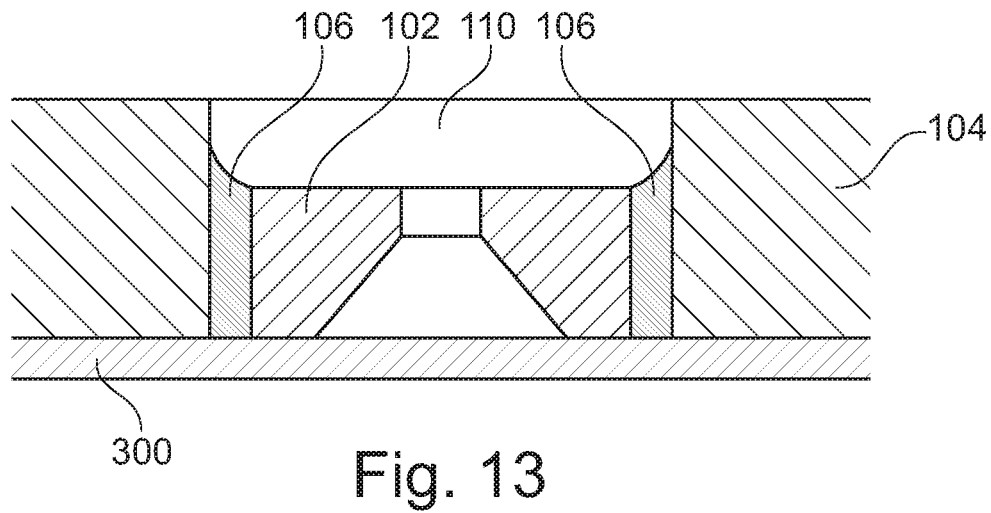

FIGS. 11-13 illustrate an embodiment of the method according to the second aspect of the invention, in which the chip 102 is arranged in the aperture, and in which a liquid tight seal is formed between the outer wall of the chip and the inner wall of the aperture.

Generally the method illustrated in FIGS. 11-13 comprises the steps of:
attaching a tape to one side of the carrier structure prior to filling said gap with the bonding material; and
removing the tape after the gap has been filled with the bonding material.

The chip is mounted in the aperture before the gap is filled with the bonding material. It may be mounted before the tap is attached to the carrier structure or thereafter.

FIG. 11 shows the carrier structure 104 with aperture 110. A tape, preferably an adhesive tape 300 is attached to one side of the carrier structure 104 with its adhesive side facing upwardly, i.e. towards the aperture 110. As shown in FIG. 12, the chip 102 is subsequently placed in the aperture with a gap between outer walls of the chip and inner walls of the carrier structure. Thereby, a lower surface of the chip 102 rests on the adhesive side of the tape 300, whereby the tape intermittently secures the chip 102 relative to the carrier structure 104, until the bonding material 106 has been applied. As shown in FIG. 13 the bonding material 106 is subsequently filled into and distributed in the gap as described above with reference to FIGS. 7-9. The bonding material 106 is subsequently cured, and in a final step the tape 300 is removed to arrive at the final product. In a preferred embodiment, the adhesive loses its tackiness during curing of the bonding material. For example, the adhesive of the tape may be one, which loses its adhesive capabilities upon exposure to UV light, whereby it detaches from the carrier structure when the bonding material is cured by UV irradiation.

The invention claimed is:

1. A chip assembly for use in a microfluidic analysis system for determining and/or monitoring electrophysiological properties of ion channels in ion channel-containing structures, comprising:
   a chip, made of silicon, having an outer wall and a lower surface, the chip defining a periphery, said chip having a planar upper surface configured to support a cell, said chip comprising a hole;
   a carrier structure, made of a plastic material, having an upper surface and comprising an aperture defining an inner wall, said aperture extending through said carrier structure from the upper surface to an opposite surface thereof; and
   a bonding material for forming a permanent liquid tight seal between the chip and the carrier structure,
   wherein the chip is permanently secured to the carrier structure by means of said bonding material,
   wherein the hole is arranged essentially coaxially with the aperture in the carrier structure,
   wherein said chip and said carrier structure are arranged to separate a cell-containing first domain located at said combined upper surfaces from a second domain,
   wherein the chip is mounted atop the carrier structure with its lower surface resting on the upper surface of the carrier structure, and
   wherein the bonding material is provided along the periphery of the chip along its outer wall and along the lower surface thereof in the vicinity of the chip's periphery.

2. A chip assembly according to claim 1, wherein said chip is one of a plurality of chips and said aperture is one of a plurality of apertures in said carrier structure, said plurality of chips being received in respective apertures of the plurality of apertures, such that each chip is mounted recessed within the carrier structure.

3. A chip assembly according to claim 1, wherein the chip has at least one dimension in a plane of the upper surface of 0.1-2 mm.

4. A chip assembly according to claim 1, wherein each of the upper and lower surfaces of the chip has an area of at most 5 mm$^2$.

5. A method of manufacturing a chip assembly for use in a microfluidic analysis system for determining and/or monitoring electrophysiological properties of ion channels in ion channel-containing structures, comprising:
   a chip made of silicon, having an outer wall and a lower surface, the chip defining a periphery, said chip having upper surface being planar and configured to support a cell, said chip comprising a hole;
   a carrier structure made of a plastics material, having an upper surface and comprising an aperture defining an inner wall, said aperture extending through said carrier structure from the upper surface to an opposite surface thereof; and
   a bonding material for forming a permanent liquid tight seal between the chip and the carrier structure,
   the method comprising:
   permanently securing, by means of said bonding material, the chip to the carrier structure atop thereof with the hole arranged essentially coaxially with the aperture in the carrier structure and with the lower surface of the chip resting on the upper surface of the carrier structure, or
   mounting the chip recessed within the carrier structure such that the planar upper surface of the chip lies flat with, or below, the upper surface of the carrier structure,
   wherein, at the step of securing, the bonding material is being provided along the periphery of the chip along its outer wall and along a lower surface thereof in the vicinity of the chip's periphery to form said permanent liquid tight seal between the chip and the carrier structure.

6. A chip assembly according to claim 1, wherein the hole in said chip is free of said bonding material.

7. A method according to claim 5, wherein the carrier structure further comprises a recess in which said aperture is located.

8. A chip assembly for use in a microfluidic analysis system for determining and/or monitoring electrophysiological properties of ion channels in ion channel-containing structures, comprising:
- a chip, made of silicon, having an outer wall and a lower surface, the chip defining a periphery, said chip having a planar upper surface configured to support a cell, said chip comprising a hole;
- a carrier structure, made of a plastic material, having an upper surface and comprising an aperture defining an inner wall, said aperture extending through said carrier structure from the upper surface to an opposite surface thereof; and
- a bonding material for forming a permanent liquid tight seal between the chip and the carrier structure,
- wherein the chip is permanently secured to the carrier structure by means of said bonding material,
- wherein the hole is arranged essentially coaxially with the aperture in the carrier structure,
- wherein said chip and said carrier structure are arranged to separate a cell-containing first domain located at said combined upper surfaces from a second domain,
- wherein the chip is mounted recessed within the carrier structure such that the planar upper surface of the chip lies flush with, or below, the upper surface of the carrier structure, and
- wherein the bonding material is provided along the periphery of the chip along its outer wall and along the lower surface thereof in the vicinity of the chip's periphery.

* * * * *